(12) United States Patent
Ljung et al.

(10) Patent No.: US 9,504,012 B1
(45) Date of Patent: Nov. 22, 2016

(54) EXTENDED DISCONTINUOUS RECEPTION MECHANISM

(71) Applicant: Sony Mobile Communications Inc., Tokyo (JP)

(72) Inventors: Rickard Ljung, Helsingborg (SE); Anders Berggren, Lund (SE); Lars Nord, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/823,535

(22) Filed: Aug. 11, 2015

Related U.S. Application Data (60) Provisional application No. 62/165,307, filed on May 22, 2015.

(51) Int. Cl.
   *H04W 68/02* (2009.01)
   *H04W 36/00* (2009.01)
   *H04W 76/04* (2009.01)

(52) U.S. Cl.
   CPC ......... *H04W 68/02* (2013.01); *H04W 36/0083* (2013.01); *H04W 76/048* (2013.01)

(58) Field of Classification Search
   CPC .............................. H04W 68/00; H04W 68/02
   USPC ................................................. 455/436–440
   See application file for complete search history.

(56) References Cited

U.S. PATENT DOCUMENTS

| | | | | |
|---|---|---|---|---|
| 8,688,119 B2 * | 4/2014 | Sagfors | ................. | H04W 36/36 370/331 |
| 2013/0229931 A1 * | 9/2013 | Kim | ...................... | H04W 24/10 370/252 |
| 2014/0321343 A1 * | 10/2014 | Gupta | ............... | H04W 36/0066 370/311 |
| 2014/0334366 A1 | 11/2014 | Hsu | | |

FOREIGN PATENT DOCUMENTS

| | | |
|---|---|---|
| EP | 3030000 A1 | 6/2016 |
| GB | 2483752 A | 3/2012 |
| WO | 2015/016530 A1 | 2/2015 |

OTHER PUBLICATIONS

Extended European Search Report from corresponding European Patent Application No. 16169461.7, mailed Sep. 16, 2016.

* cited by examiner

*Primary Examiner* — Michael T Vu
(74) *Attorney, Agent, or Firm* — Tucker Ellis LLP (57) ABSTRACT

A method, a device, and a non-transitory storage medium having instructions to obtain extended discontinuous reception (DRX) parameters from a wireless network; store the extended DRX parameters; camp on a cell of the wireless network; wake up from an idle state based on the extended DRX parameters, wherein the device wakes up at a time, prior to a paging occasion, wherein a time period from the time to the paging occasion has a duration during which the device can perform a cell reselection procedure, and subsequently, a tracking area update; measure a metric of the cell in response to a wake up; and monitor a scheduled paging occasion, wherein the scheduled paging occasion is a paging occasion that is first to occur subsequent to the wake up.

20 Claims, 10 Drawing Sheets

EXTENDED DISCONTINUOUS RECEPTION MECHANISM

CROSS-REFERENCE TO RELATED APPLICATION

This application claims priority under 35. U.S.C. §119, based on U.S. Provisional Patent Application No. 62/165,307 filed May 22, 2015, the disclosure of which is hereby incorporated by reference herein.

BACKGROUND

Typically, a wireless device (e.g., user equipment (UE), a machine-type device (MTD), etc.) is configured to perform various operations during a cell search and selection procedure, which may occur upon initial boot-up, and a subsequent cell search and reselection procedure, after attachment to a wireless network. The wireless device may also listen for a paging message based on a discontinuous reception (DRX) cycle. Currently, according to Release 13 of a $3^{rd}$ Generation Partnership Project (3GPP) standard, an extended DRX (eDRX) cycle is being specified.

SUMMARY

According to one aspect, a method may comprise obtaining, by a wireless device, extended discontinuous reception (DRX) parameters from a wireless network; storing, by the wireless device, the extended DRX parameters; camping, by the wireless device, on a cell of the wireless network; waking up, by the wireless device, from an idle state based on the extended DRX parameters, wherein the wireless device wakes up at a time, prior to a paging occasion, wherein a time period from the time to the paging occasion has a duration during which the wireless device can perform a cell reselection procedure, and subsequently, a tracking area update; measuring, by the wireless device, a metric of the cell in response to the waking up; and monitoring, by the wireless device, a scheduled paging occasion, wherein the scheduled paging occasion is a paging occasion that is first to occur subsequent to the waking up.

According to another aspect, a device may comprise a communication interface; a memory, wherein the memory stores instructions; and a processor. The processor may be configured to execute the instructions to obtain, via the communication interface, extended DRX parameters from a wireless network; store the extended DRX parameters; camp on a cell of the wireless network; wake up from an idle state based on the extended DRX parameters, wherein the device wakes up at a time, prior to a paging occasion, wherein a time period from the time to the paging occasion has a duration during which the device can perform a cell reselection procedure, and subsequently, a tracking area update; measure, via the communication interface, a metric of the cell in response to a wake up; and monitor, via the communication interface, a scheduled paging occasion, wherein the scheduled paging occasion is a paging occasion that is first to occur subsequent to the wake up.

According to yet another aspect, a non-transitory storage medium may store instructions executable by a processor of a computational device. The computational device may be configured, based on the instructions stored, to obtain extended DRX parameters from a wireless network; store the extended DRX parameters; wake up from an idle state based on the extended DRX parameters, wherein the computational device wakes up at a time, prior to a paging occasion, wherein a time period from the time to the paging occasion has a duration during which the computational device can perform a cell reselection procedure, and subsequently, a tracking area update; and monitor a scheduled paging occasion, wherein the scheduled paging occasion is a paging occasion that is first to occur subsequent to the wake up.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

While a wireless device, which may be connected to, for example, a Long Term Evolution (LTE) network, is in an active state, the location of the wireless device is known at a cell level. However, while the wireless device is in an idle state, the location of the wireless device is known at a tracking area (TA) level.

When there is traffic destined to the wireless device, while in an idle state, the wireless network has to move the wireless device from the idle state to a connected state so that the wireless device can receive the incoming data. A process known as "paging" is a procedure to transmit a paging message to the wireless device while in radio resource control (RRC) idle mode or evolved packet system (EPS) mobility management (EMM) registered state. The wireless device wakes up at certain periods (e.g., a paging occasion (PO)) and monitors a physical downlink control channel (PDCCH) in order to determine whether the wireless device is being paged. If needed, the wireless device may switch to a connected mode when the wireless device is being paged so that the wireless device may receive the incoming data. The wireless device wakes up to check for a paging message based on a DRX parameter (e.g., a default DRX parameter value, a UE-specific DRX parameter value, etc.) that indicates a DRX cycle.

As previously described, an extended DRX is being specified. The eDRX cycle may have a time period as long as ten (10) minutes or perhaps even longer. As a result, the wireless device may have a longer idle cycle, which in turn may reduce power consumption. Depending on the wireless device, this may be beneficial. For example, a machine-type communication (MTC) device may be delay tolerant in terms of engaging in a session. Additionally, or alternatively, the MTC device may be conservative in terms of power consumption. On the other hand, a non-MTC device (e.g., UE) may not be delay tolerant and/or may be less concerned with power consumption.

When a wireless device attaches to the wireless network, the wireless device obtains a tracking area identifier (TAI) list. The TAI list indicates one or multiple TAs where the wireless network believes the wireless device is located and within which the wireless device can travel without transmitting a tracking area update (TAU) request. When the wireless device performs cell measurements and decides to camp on a cell belonging to a TA that is not indicated in the TAI list, the wireless device will transmit a TAU request. In this way, the wireless network is updated as to the current location of the wireless device. In response to receiving the TAU request, the wireless network may update nodes of the wireless network as to the current location of the wireless network.

3GPPP standards do not specify an ordering between cell measurement and listening for potential paging messages, much less a timing between these two operations. In view of the extended interval of time associated with an eDRX cycle, a missed page may have more of a negative impact than when the wireless device operates according to a DRX cycle since the interval of time associated with the DRX cycle may be significantly shorter. Thus, when the wireless device misses a potential page when operating according to the eDRX cycle, the wireless device may have to wait an extended period of time (e.g., up to 10 minutes or more) to receive a next paging occurrence. By way of example, when the wireless device decides to camp within a TA, which is not indicated in the TAI list, the wireless device might miss a paging occasion due to the wireless network not having accurate location information with respect to the wireless device. That is, the tracking area update process may not be completed before the upcoming paging occasion. Consequently, the wireless network transmits a page according to the last registered TA instead of the new TA.

According to an exemplary embodiment, an extended DRX mechanism comprises an ordering of measuring/cell reselecting and monitoring for a potential page. According to an exemplary implementation, the extended DRX mechanism provides that the wireless device performs measuring/cell reselecting before monitoring for a potential page. According to an exemplary embodiment, the extended DRX mechanism comprises an allotment of time between measuring/cell reselecting and monitoring for a potential page. According to an exemplary implementation, the extended DRX mechanism allots a sufficient amount of time for completion of a TAU (e.g., to a new TA not indicated in the TAI list) so that the wireless network is updated as to the current location (e.g., new cell, new TA) of the wireless device. Additionally, or alternatively, according to an exemplary implementation, the extended DRX mechanism allots a sufficient amount of time for the wireless device to camp on a new cell belonging to a new TA not indicated in the TAI list.

According to an exemplary implementation, the extended DRX mechanism comprises an allotment of time to acquire a new extended DRX cycle (e.g., via a System Information Block (SIB) message, a Non-Access Stratum (NAS) message, etc.) and identify when the next paging occasion occurs within this new cell. Additionally, or alternatively, the extended DRX mechanism comprises an allotment of time to monitor for a next scheduled paging occasion that occurs within the new cell. Based on the extended DRX mechanism, as described herein, the wireless device may minimize the occurrence of missing a paging occasion before entering an extended DRX idle interval.

Figure 1:
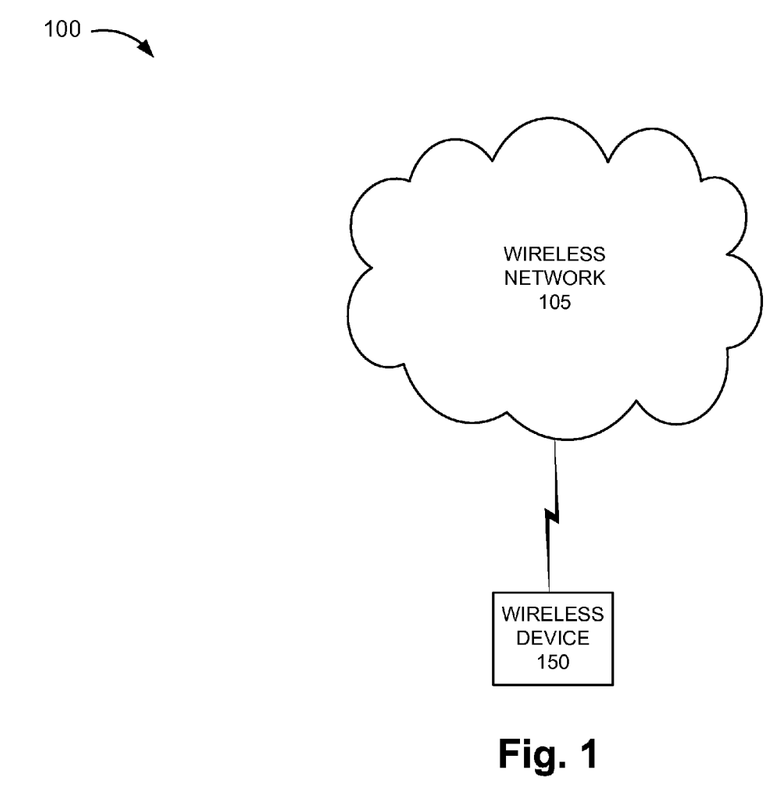
FIG. 1 is a diagram illustrating an exemplary environment in which exemplary embodiments of an extended DRX mechanism may be implemented.

FIG. 1 is a diagram illustrating an exemplary environment 100 in which exemplary embodiments of extended DRX may be implemented. As illustrated, environment 100 includes a wireless network 105. As further illustrated, environment 100 includes a wireless device 150.

Environment 100 may be implemented to include wireless connections between wireless device 150 and wireless network 105. A connection may be direct or indirect and may involve an intermediary device and/or an intermediary network not illustrated in FIG. 1. Additionally, the number and the arrangement of the connection between wireless device 150 and wireless network 105 are exemplary.

Wireless network 105 includes one or multiple wireless networks of one or multiple types. Wireless network 105 may be implemented using various wireless architectures, standards, and/or technologies. By way of further example, wireless network 105 may be implemented to include an LTE network, an LTE Advanced (LTE-A) network, an Evolved Universal Terrestrial Radio Access Network (E-UTRAN), a Universal Mobile Telecommunications System (UMTS) network, and/or another type of wireless network (e.g., a future generation wireless network architecture, etc.). Additional examples of wireless network 105 may include a Global System for Mobile Communications (GSM) network, a Wideband Code Division Multiple Access (WCDMA) network, an Ultra Mobile Broadband (UMB) network, a High-Speed Packet Access (HSPA) network, an Evolution Data Optimized (EV-DO) network, a Worldwide Interoperability for Microwave Access (Wi-MAX) network.

Given the wide variety of wireless networks that may be implemented in various embodiments, wireless network 105 may include various types of network devices, such as a base station, a base station controller, an evolved Node B (eNB), a home eNB, a serving gateway (SGW), a home node B, a wireless relay node, a pico base station, a femto device, a base transceiver station, a repeater, a user device gateway, a radio node, an anchor point, a wireless router, etc. Wireless network 105 may include other types of network devices, such as a network device that pertain to billing, security (e.g., a firewall, etc.), authentication and authorization, network policies, providing a service or an asset, providing access to another network, etc.

Wireless device 150 includes a device with wireless communication capabilities. Wireless device 150 may be a mobile device. For example, wireless device 150 may be implemented as a smartphone, a tablet device, a netbook, an e-reader, a personal data assistant (PDA), a vehicular communication system within a vehicle, a computer, a wearable device (e.g., a watch, glasses, etc.), a music playing device, a location-aware device, or other mobile, wireless device. Alternatively, wireless device 150 may be a non-mobile (e.g., stationary) device. For example, wireless device 150 may be implemented as a kiosk, a point of sale terminal, a vending machine, a set top box, a smart television, a parking meter, a sensor, etc.

According to an exemplary embodiment, wireless device 150 is implemented as an end user device. According to another exemplary embodiment, wireless device 150 is implemented as a non-end user or machine-type device. By way of example, wireless device 150 may be implemented for wireless, machine-to-machine (M2M) communication, such as a meter device associated with providing a utility service (e.g., gas, electric, etc.), a smart device (e.g., a sensor device, a home security system, a healthcare device, etc.).

The phrase "machine-to-machine" or "M2M" communication, as used herein, is intended to be broadly interpreted to include other terms and their meanings, such as, for example, device-to-device (D2D) communication, an Internet of Things (IoT) communication, and/or telemetry.

Figure 2A:
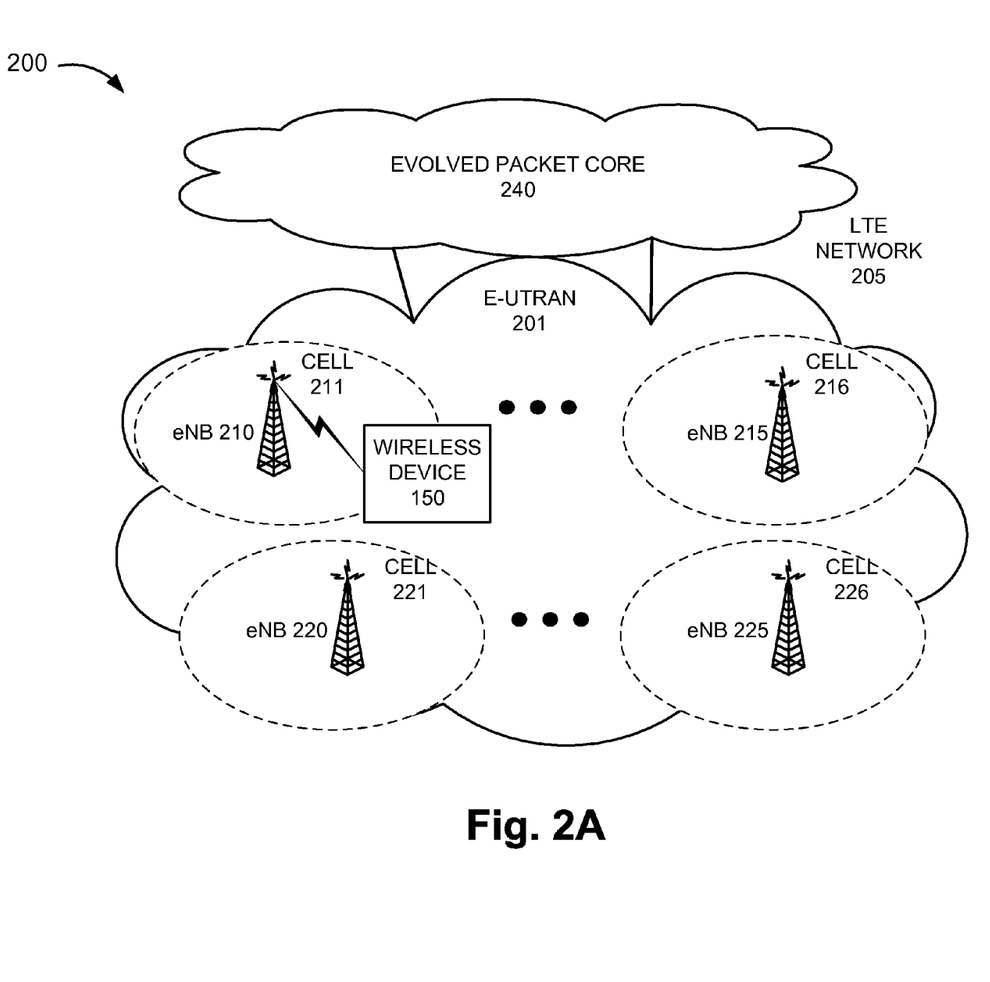
FIGS. 2A-2C are diagrams that illustrate an exemplary process pertaining to the extended DRX mechanism.

An exemplary embodiment of the extended DRX mechanism is described further below in relation to FIGS. 2A-2E. FIG. 2A illustrates an exemplary environment 200 in which an exemplary embodiment of the extended DRX mechanism may be implemented. As illustrated, environment 200 includes an LTE network 205. LTE network 205 is an exemplary implementation of wireless network 105. As illustrated, LTE network 205 comprises an E-UTRAN 201 and an Evolved Packet Core (EPC) 240. E-UTRAN 201 comprises eNB 210, an eNB 215, an eNB 220, and an eNB 225, which define cells 211, 216, 221, and 226, respectively. Although wireless device 150 is depicted within E-UTRAN 201, wireless device 150 is not considered a part of E-UTRAN 201. Rather, wireless device 150 is considered a device that is apart from LTE network 205.

Although not illustrated, EPC 240 comprises network elements (e.g., a packet data network gateway (PGW), a serving gateway (SGW), a Mobility Management Entity (MME), etc.) which are typically present in an LTE network operating according to a 3GPP standard, but have been omitted for purposes of brevity.

Referring to FIG. 2A, assume that wireless device 150 is camped on cell 211 and attached to LTE network 205 via eNB 210. Assume that wireless device obtains extended DRX parameters. The extended DRX parameters comprise a timer parameter that indicates a time window. During the time window, wireless device 150 may perform various procedures comprising, for example, a cell search and reselection procedure, and a TAU procedure. As previously described, due to the potential, extended DRX idle period associated with eDRX, the extended DRX mechanism provides that LTE network 205 may be made aware of a change in location pertaining to wireless device 150 (e.g., using a TAU procedure, when invoked), as well as minimizing a risk that wireless device 150 misses a potential paging message when wireless device 150 camps on a new cell.

According to an exemplary embodiment, the timer parameter has a static value. According to another exemplary embodiment, the timer parameter has a dynamic value. For example, as previously described, typically DRX parameters are provided to wireless device 150 via a SIB message (e.g., a SIB Type 2 message) or a NAS message from the wireless network (e.g., LTE network 205). Based on this framework, the wireless network may update the value of the timer parameter based on one or multiple criteria. For example, the value of the timer parameter may be decreased when a congestion level pertaining to the wireless network or relevant portion thereof is low (e.g., relative to a threshold value). Conversely, the value of the timer parameter may be increased when a congestion level is high (e.g., relative to a threshold value). According to yet other embodiments, the value of the timer parameter may be updated based on other types of configurable network policies and/or subscriber policies. For example, wireless device 150 may transmit a Power Preference Indicator (PPI), which indicates a low power state (e.g., remaining battery) to the wireless network (e.g., eNB 210, etc.). In response, the wireless network may update the value of the timer parameter. For example, when the PPI indicates a low power state, the timer parameter may be increased so as to conserve power with respect to wireless device 150. In some cases, this may be acceptable or desirable when wireless device 150 is delay-tolerant and/or power conservation is a priority.

Referring again to FIG. 2A, as previously mentioned, assume wireless device 150 is attached to and registered with (e.g., camped) LTE network 205 via eNB 210. Also assume that wireless device 150 obtains and stores a TAI list during the attachment procedure. Thereafter, wireless device 150 enters an idle state (e.g., ECM-Idle or RRC-Idle) and subsequently wakes up based on the extended DRX parameters (e.g., an eDRX cycle and the timer parameter). Wireless device 150 monitors and measures metrics (e.g., a Reference Signal Received Power (RSRP) and a Reference Signal Received Quality (RSRQ)) pertaining to serving cell 211. Wireless device 150 compares the measured metrics to threshold RSRP and RSRQ values. For example, wireless device 150 may receive triggering criteria for cell reselection from data carried in a SIB Type 3 message. Based on the comparison, wireless device 150 determines to initiate a cell reselection procedure. For example, wireless device 150 begins to measure the signal strength of neighboring cells, such as cell 221. Since the details pertaining to cell reselection (e.g., cell-ranking, dwelling time, hysteresis, cell-specific offset values, etc.) is beyond the scope of this description, such details have been omitted for purposes of brevity. However, wireless device 150 may perform a cell reselection procedure according to a 3GPP specification.

Figure 2B:
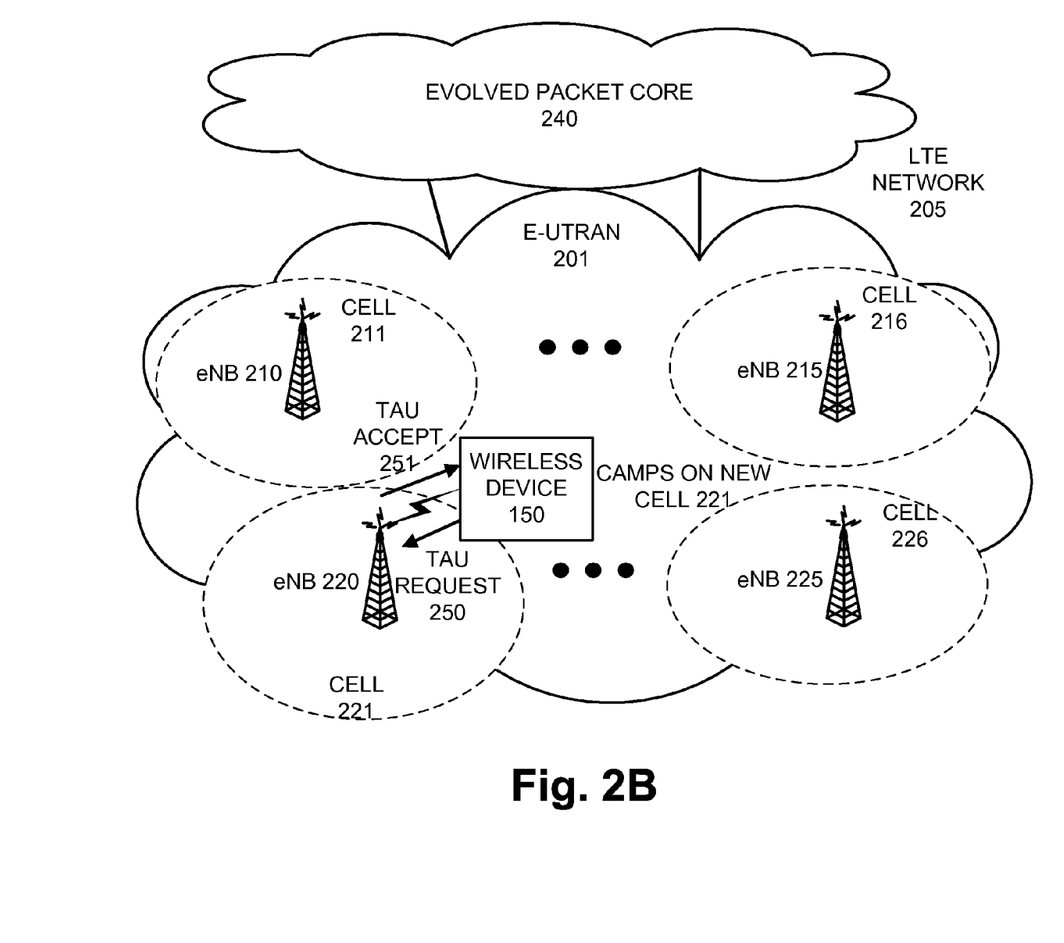

Referring to FIG. 2B, assume during the cell reselection procedure, wireless device 150 selects eNB 220 and cell 221 on which to camp. Wireless device 150 camps on cell 221. Wireless device 150 may receive a SIB Type 1 message and listen to other SIB messages (e.g., SIB Type 2, SIB Type 3, etc.), which may include extended DRX parameters, pertaining to cell 221, eNB 220, and the new TA. In some cases, the new cell (e.g., cell 221) may not support eDRX. In that case, wireless device 150 may need to fallback to a normal DRX scheme. However, when the new cell supports eDRX, wireless device 150 may need to re-synch with the new cell's system frame numbers (SFNs), etc. For example, in eDRX, the paging occasions may not happen in all system frames (e.g., some systems frames do not comprise paging occasions).

Also, wireless device 150 determines, based on the TAI list, that eNB 220 and/or cell 221 is not a TA indicated in the TAI list. Wireless device 150 establishes a radio resource connection (RRC) with eNB 220. As illustrated, wireless device 150 transmits a TAU request 250, via eNB 220, to an MME (not illustrated) of EPC 240. Wireless device 150 transitions from an idle state (e.g., ECM-idle, RRC-idle) to a connected state (EMM-registered, EPS Connection Management (ECM)-connected, RRC-connected). TAU request 250 may include data specified in a 3GPP standard (e.g., last visited TAI, a globally unique temporary identifier (GUTI) of wireless device 150, etc.). In response, the MME determines that wireless device 150 is not in a TA indicated in a last TAU. The MME allocates a new set of TAs that best suits the current location of wireless device 150 and perhaps other factors (e.g., speed of wireless device 150, etc.). The MME updates the last visited TAI value included in the wireless device context. The MME transmits a TAU accept 251, which may carry a new TAI list (and GUTI if applicable). Wireless device 150 receives the TAU accept 251, via eNB 220, and stores the new TAI list. Additionally, as previously described, various network elements of LTE network 205 may be updated. For example, the MME may notify a PGW, an SGW, etc. (not illustrated). The PGW may also notify a Policy and Charging Rules Function (PCRF) (not illustrated) of EPC 240.

After completion of the TAU procedure, the MME may release an S1 connection between the MME and eNB 220. In response, eNB 220 may release the RRC connection established with wireless device 150 and wireless device 150 may return to an idle state.

Figure 2C:
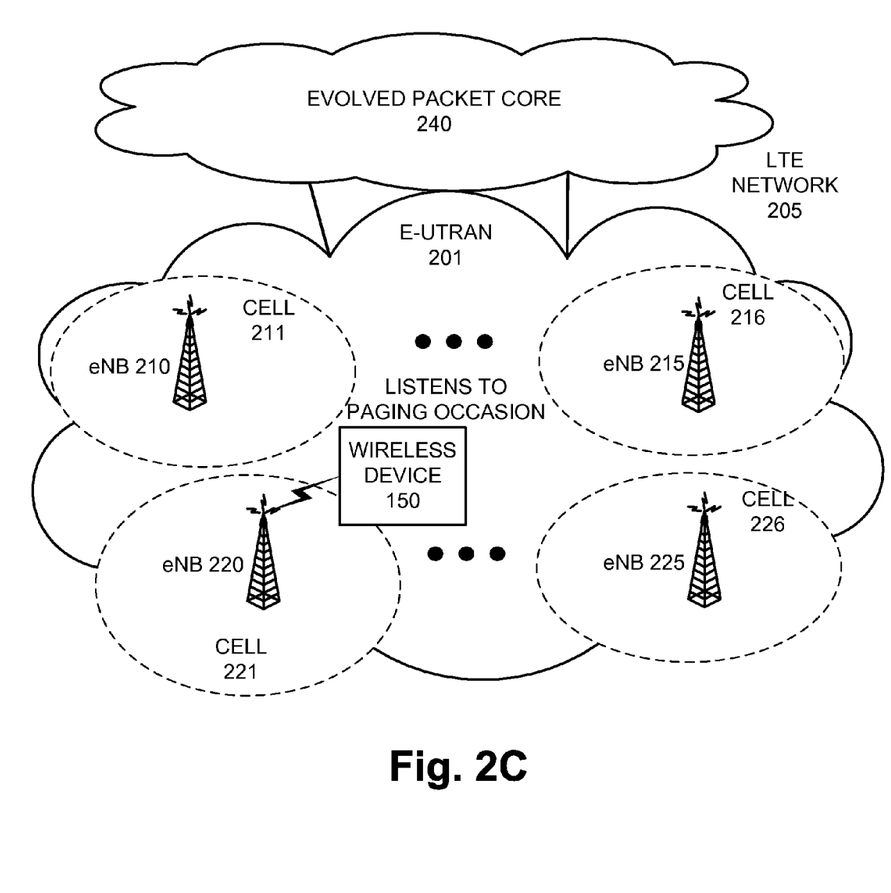

Referring to FIG. 2C, since the TAU has been completed, LTE network 205 may transmit and wireless device 150 may monitor for one or multiple paging occasions that may occur within the paging frame. Accordingly, as illustrated, wireless device 150 wakes up and listens to the paging occasion(s) directed to wireless device 150. According to this example, wireless device 150 does not receive a page and subsequently returns to an eDRX idle state. According to another example, when the PDCCH indicates that a paging message, wireless device 150 may operate according to 3GPP standards.

Figure 2D:
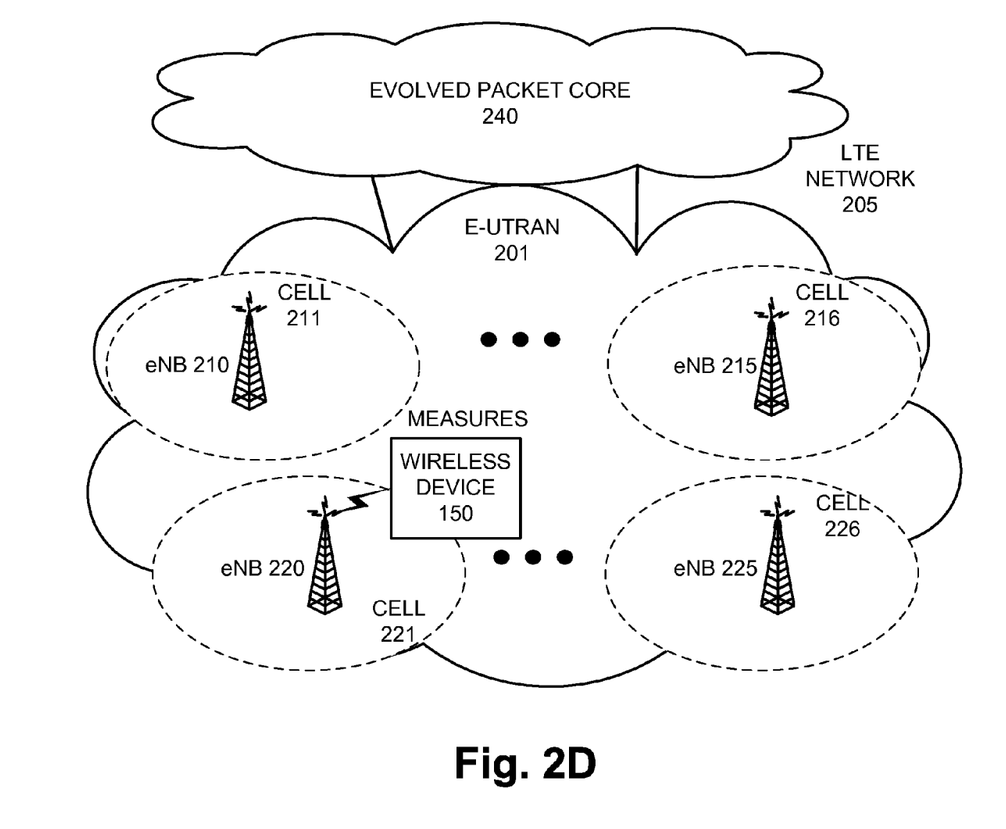
FIGS. 2D and 2E are diagrams that illustrate another exemplary process pertaining to the extended DRX mechanism.
Figure 2E:
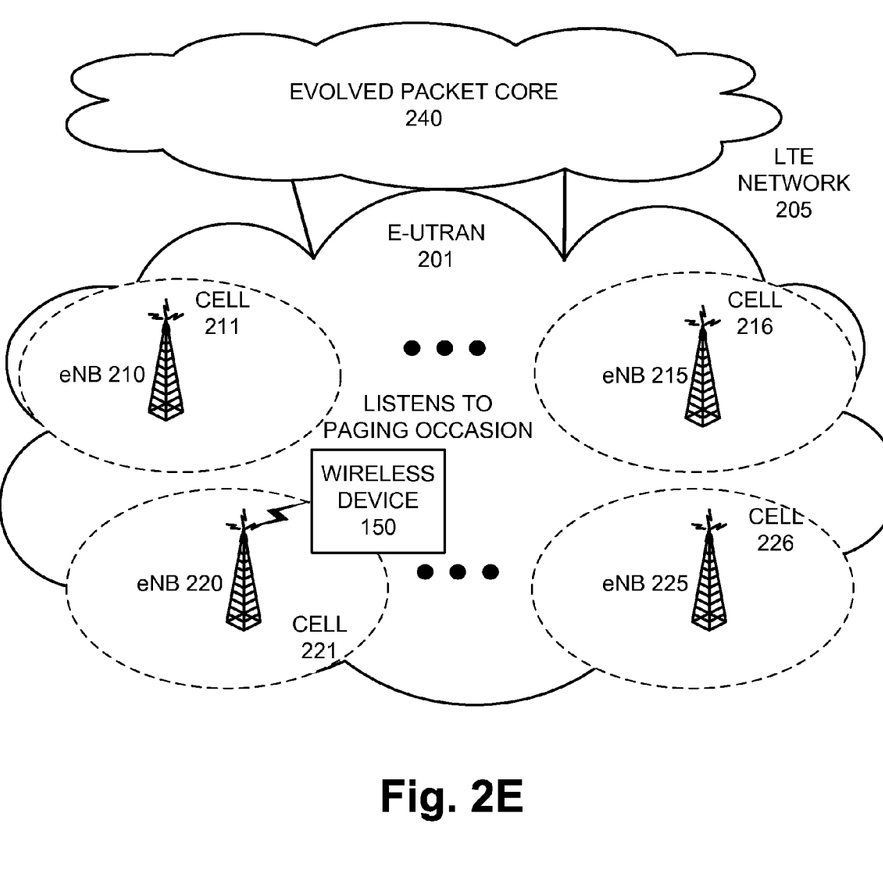

FIGS. 2D and 2E are diagrams that illustrate another exemplary process pertaining to the extended DRX mechanism. Referring to FIG. 2D, and in continuation of the exemplary scenario described in relation to FIGS. 2A-2C, assume that wireless device 150, while camped on cell 221 enters an idle state and subsequently wakes up based on the extended DRX parameters. Wireless device 150 monitors and measures metrics (e.g., RSRP and RSRQ) pertaining to serving cell 221. Wireless device 150 compares the measured metrics to threshold RSRP and RSRQ values. Based on the comparison, wireless device 150 determines to remain in the current serving cell 221.

As previously described, according to an exemplary embodiment, the timer parameter indicates a time window so that various procedures may be performed before the next, scheduled paging occasion. According to this example, since wireless device 150 determines to remain in the current serving cell 221, a remaining period of the time window may be longer than in the previous example where a reselection procedure and a TAU procedure is invoked.

According to an exemplary implementation, wireless device 150 may return to the idle mode and wake up again to monitor a paging occasion. As illustrated in FIG. 2E, wireless device 150 is in an awaken state to listen to the paging occasion.

Figure 2F:
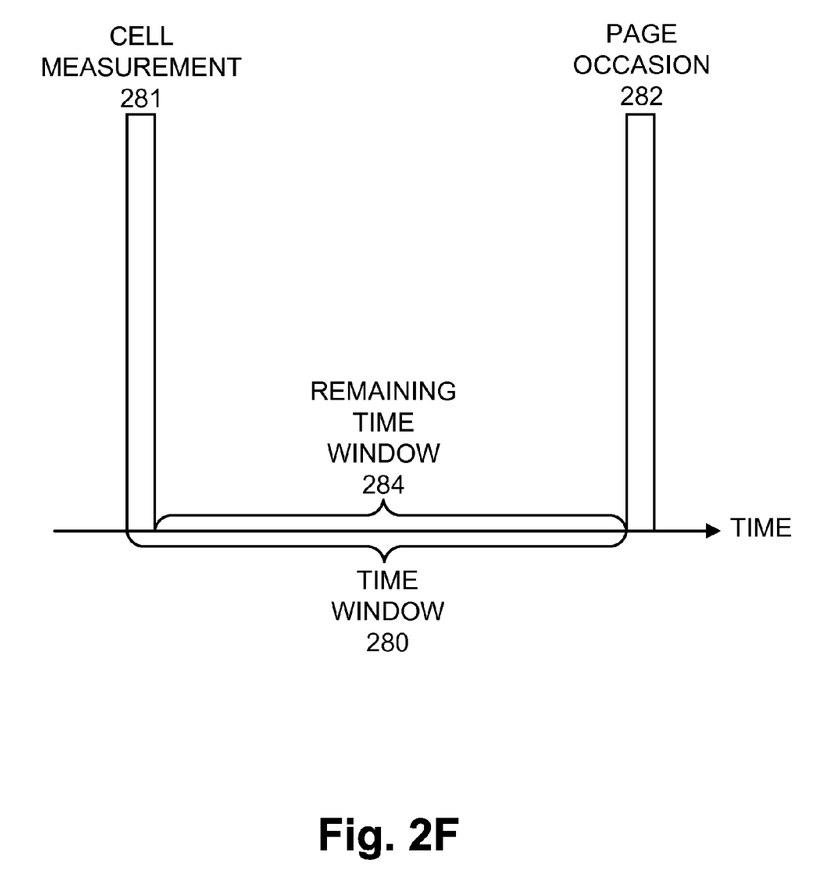
FIG. 2F is a timing diagram illustrating an exemplary time window of the extended DRX mechanism.

FIG. 2F is a timing diagram illustrating an exemplary time window of the extended DRX mechanism. As illustrated, a time window 280 spans a time period from a cell measurement 281 to a page occasion 282. As previously described, according to an exemplary implementation, time window 280 may provide a time period, which is sufficient in length, to perform a cell reselection procedure and a TAU procedure, which may be performed subsequent to cell measurement, when wireless device 150 determines that cell reselection has been triggered based on a cell measurement procedure and the new TA of a new cell is not included in the TAI list.

During time window 280, depending on the outcome of the cell measurement procedure, as well as other factors (e.g., cell reselection triggers, criteria, etc.), wireless device 150 may remain in the wake up state or return to the idle state, as previously described, during a remaining time window 284.

As previously described, time window 280 may be a static time period or may be a dynamic time period. The time duration of time window 280 may be calculated based on previous measurements, testing, etc., performed by network administrative personnel, etc., as well as 3GPP standards, etc., with respect to wireless network 105. According to an exemplary implementation, the extended DRX parameters comprise a parameter value that indicates time window 280.

In this regard, time window 280 may be configured by wireless network 105. Alternatively, time window 280 may be a user preference or configurable by the wireless service provider.

Figure 3:
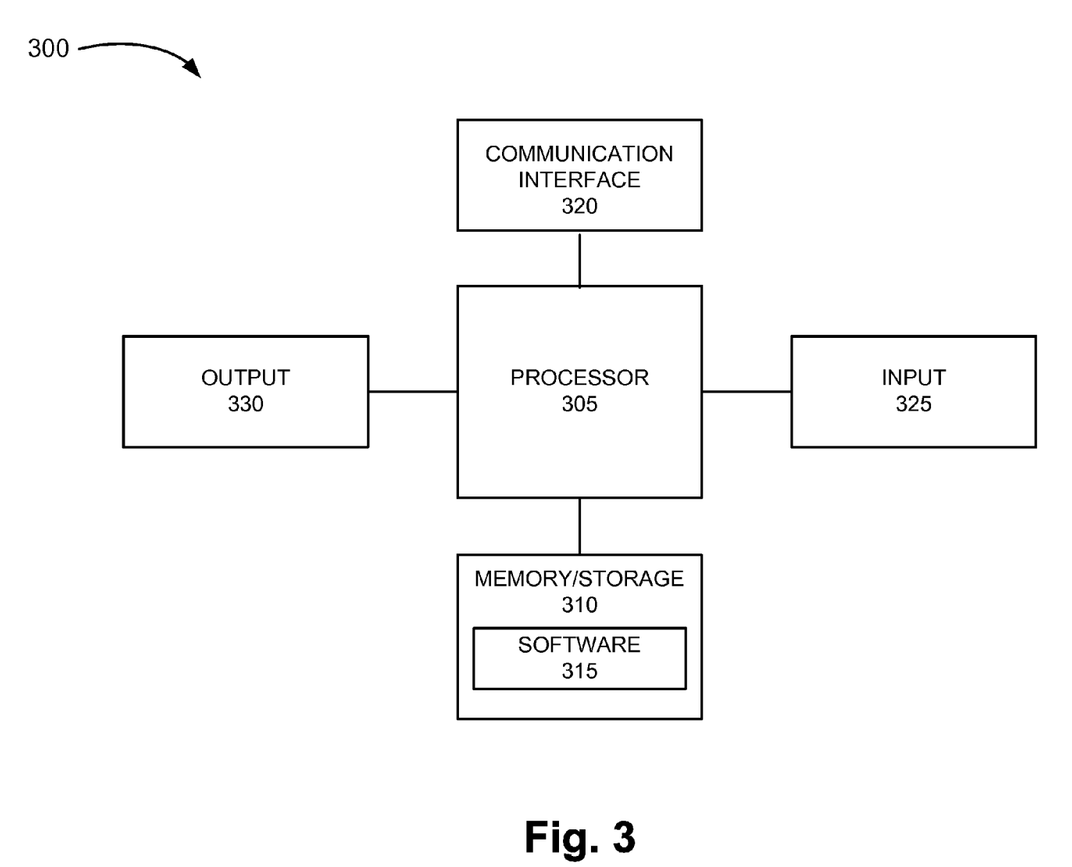
FIG. 3 is a diagram illustrating exemplary components of a device that may correspond to one or more of the devices in the exemplary environments.

FIG. 3 is a diagram illustrating exemplary components of a device 300 that may correspond to one or more of the devices in the environments described herein. For example, device 300 may correspond to network devices of wireless network 105 and wireless device 150. As illustrated, according to an exemplary embodiment, device 300 includes a processor 305, memory/storage 310 that stores software 315, a communication interface 320, an input 325, and an output 330. According to other embodiments, device 300 may include fewer components, additional components, different components, and/or a different arrangement of components than those illustrated in FIG. 3 and described herein.

Processor 305 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 305 may be implemented as hardware (e.g., a microprocessor, etc.), a combination of hardware and software (e.g., a SoC, an ASIC, etc.), may include one or multiple memories (e.g., cache, etc.), etc.

Processor 305 may control the overall operation or a portion of operation(s) performed by device 300. Processor 305 may perform one or multiple operations based on an operating system and/or various applications or programs (e.g., software 315). Processor 305 may access instructions from memory/storage 310, from other components of device 300, and/or from a source external to device 300 (e.g., a network, another device, etc.).

Memory/storage 310 includes one or multiple memories and/or one or multiple other types of storage mediums. For example, memory/storage 310 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 310 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 310 may include drives for reading from and writing to the storage medium.

Memory/storage 310 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 310 may store data, software, and/or instructions related to the operation of device 300.

Software 315 includes an application or a computer program that provides a function and/or a process. Software 315 may include firmware. For example, with reference to wireless device 150, software 315 may include an application that, when executed by processor 305, provides the extended DRX mechanism functions as described herein.

Communication interface 320 permits device 300 to communicate with other devices, networks, systems, etc. Communication interface 320 may include one or multiple wireless interfaces and/or wired interfaces. Communication interface 320 may include one or multiple transmitters and receivers or transceivers. The transmitter and the receiver may perform various functions, such as signal amplification, frequency conversion, filtering, channel selection, analog-to-digital conversion, modulation/demodulation, etc. Communication interface 320 may also include one or multiple antenna elements. Communication interface 320 may operate according to a protocol stack and a communication standard.

Input 325 permits an input into device 300. For example, input 325 may include a keyboard, a mouse, a display, a touchscreen, a touchless screen, a button, a switch, an input port, speech recognition logic, and/or some other type of visual, auditory, tactile, etc., input component. Output 330 permits an output from device 300. For example, output 330 may include a speaker, a display, a touchscreen, a touchless screen, a light, an output port, and/or some other type of visual, auditory, tactile, etc., output component.

Device 300 may perform a process and/or a function, as described herein, in response to processor 305 executing software 315 stored by memory/storage 310. By way of example, instructions may be read into memory/storage 310 from another memory/storage 310 (not shown) or read from another device (not shown) via communication interface 320. The instructions stored by memory/storage 310 may cause processor 305 to perform a process described herein. Alternatively, for example, according to other implementations, device 300 may perform a process described herein based on the operation of hardware (processor 305, etc.).

Figure 4A:
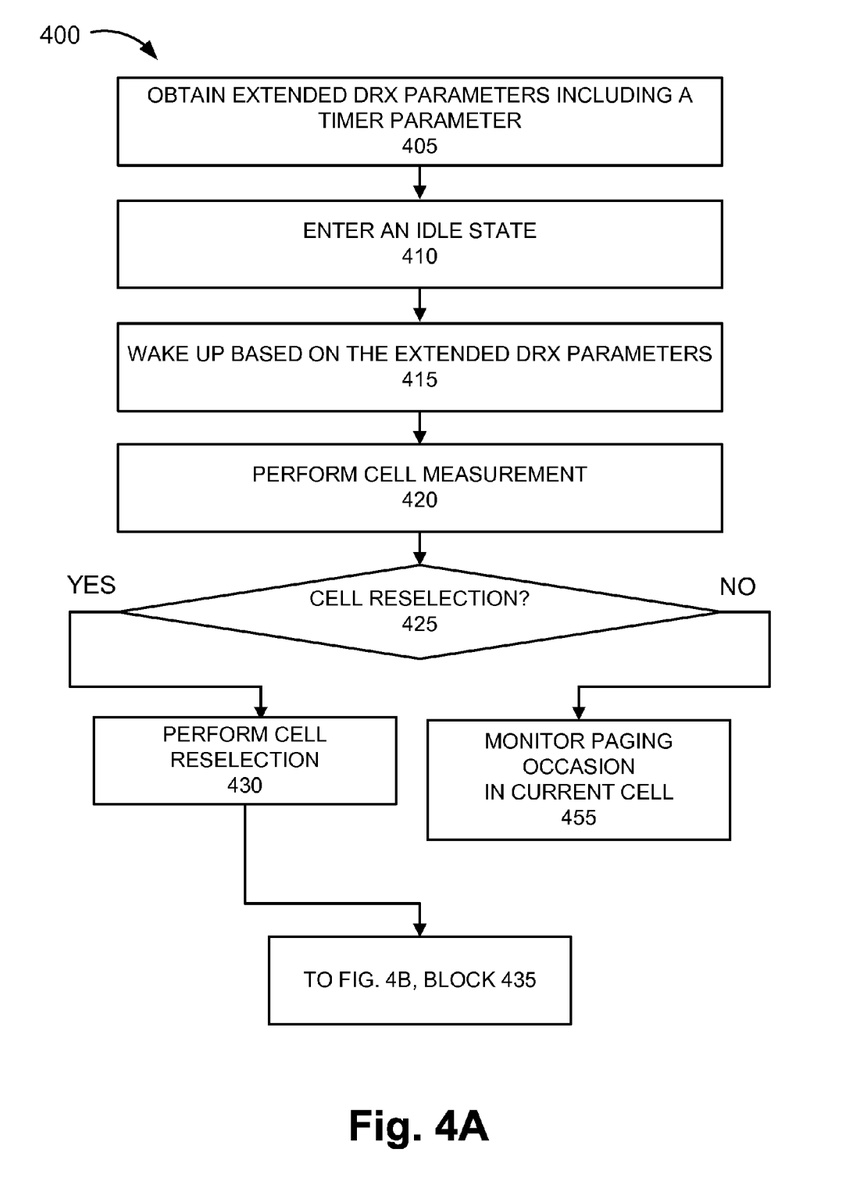
FIGS. 4A and 4B are flow diagrams that illustrate an exemplary process pertaining to an exemplary embodiment of the extended DRX mechanism.
Figure 4B:
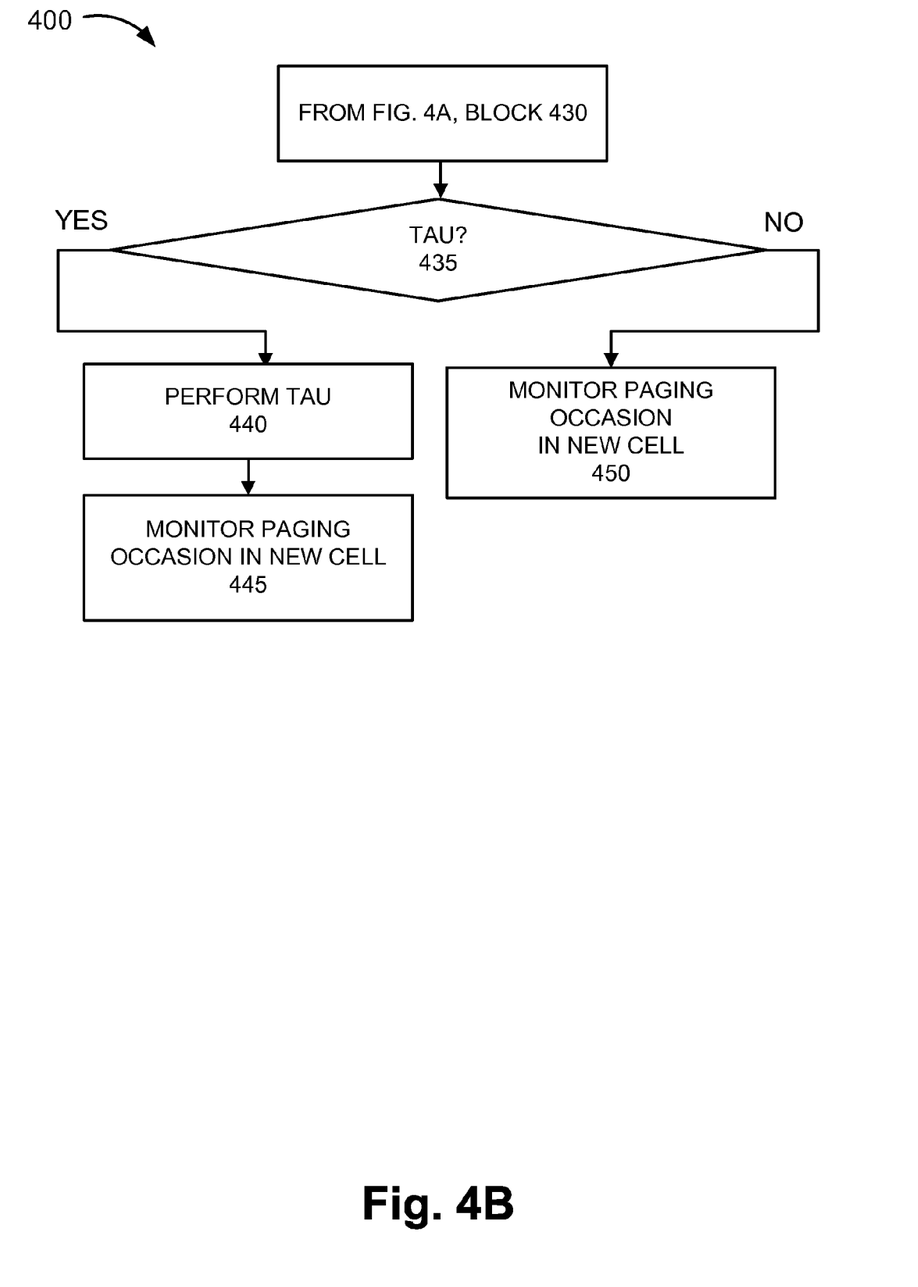

FIGS. 4A and 4B are flow diagrams that illustrate an exemplary process pertaining to an exemplary embodiment of the extended DRX mechanism. Process 400 is directed to a processes previously described above with respect to FIGS. 2A-2E and elsewhere in this description, in which an eDRX cycle comprises a time window specified by a timer parameter of the extended DRX parameters. According to an exemplary embodiment, wireless device 150 performs the steps described in process 400. For example, processor 305 may execute software 315 to perform the steps described.

Referring to FIG. 4A, process 400 may begin with obtaining extended DRX parameters that include a timer parameter. For example, wireless device 150 obtains the extended DRX parameters that pertain to an eDRX cycle. According to an exemplary implementation, the extended DRX parameters include a timer parameter. The timer parameter indicates a time window that begins prior to a paging occurrence. At the onset of the time window, wireless device 150 may wake up from an idle mode and perform various operations, as previously described. As previously described, the extended DRX parameters may be carried in a SIB message or a NAS message. Additionally, wireless device 150 obtains a TAI list.

In block 410, wireless device enters an idle state. For example, wireless device 150 enters an idle state due to device inactivity or other reasons.

In block 415, wireless device wakes up based on the extended DRX parameters. For example, wireless device 150 wakes up from the idle state based on the timer parameter.

In block 420, a cell measurement is performed. For example, wireless device 150 measures metrics of the serving cell in response to the wake up.

In block 425, it is determined whether cell reselection is to be performed. For example, wireless device 150 determines whether cell reselection is to be performed based on the measured metrics of the serving cell on which wireless device 150 is camped.

When it is determined that a cell reselection is to be performed (block 425—YES), a cell reselection procedure is performed (block 430). For example, when wireless device 150 determines that cell reselection is to be performed, wireless device 150 measures neighboring cells, performs cell evaluations, etc., and selects a new cell on which to camp.

Referring to FIG. 4B, block 435, it is determined whether a TAU procedure is to be performed. For example, wireless device 150 determines whether the TA of the new cell is included in the TAI list. When the TA of the new cell is not included in the TAI list, wireless device 150 determines to perform the TAU procedure. When the TA of the new cell is included in the TAI list, wireless device 150 determines not to perform the TAU procedure.

When it is determined that the TAU procedure is to be performed (block 435—YES), the TAU procedure is performed (block 440). For example, wireless device 150 transmits a TAU request. Wireless device 150 receives a TAU accept that is responsive to the TAU request. The TAU accept message may carry a new TAI list.

In block 445, the next paging occasion is monitored in the new cell. For example, wireless device 150 monitors the next scheduled paging occasion in the new cell.

When it is determined that the TAU procedure is not to be performed (block 435—NO), the next paging occasion is monitored in the new cell (block 450). For example, wireless device 150 monitors the next scheduled paging occasion in the new cell.

Referring back to FIG. 4A, when it is determined that a cell reselection is not to be performed (block 425—NO), the next paging occasion is monitored in the current cell (block 455). For example, wireless device 150 monitors the next scheduled paging occasion in the current cell.

Although FIGS. 4A and 4B illustrate an exemplary eDRX process 400, according to other embodiments, process 400 may include additional operations, fewer operations, and/or different operations than those illustrated in FIGS. 4A and 4B, and as described herein. Process 400 may be continuously repeated (e.g., from block 405) or portions thereof (e.g., from block 410) during each eDRX cycle. Additionally, although the eDRX cycle has been described in relation to extended periods (e.g., 10 minutes or longer), the extended DRX mechanism may yield benefits to a device having a shorter eDRX cycle. Thus, the use of the extended DRX mechanism, as described herein should not be construed as limited to an eDRX cycle having a range from 10 minutes or longer.

The foregoing description of embodiments provides illustration, but is not intended to be exhaustive or to limit the embodiments to the precise form disclosed. Various modifications and changes may be made thereto, and additional embodiments may be implemented, without departing from the broader scope of the invention as set forth in the claims that follow. The specification and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIGS. 4A and 4B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 305, etc.), or a combination of hardware and software (e.g., software 315). The embodiments have been described without reference to the specific software code since the software code can be designed to implement the embodiments based on the description herein and commercially available software design environments/languages.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, data structures, program modules, an application, etc. A non-transitory storage medium includes one or more of the storage mediums described in relation to memory/storage 310.

The word "exemplary" is used herein to mean "serving as an example." Any embodiment or implementation described as "exemplary" is not necessarily to be construed as preferred or advantageous over other embodiments or implementations.

No element, act, or instruction described in the present application should be construed as critical or essential to the embodiments described herein unless explicitly described as such.

What is claimed is:

1. A method comprising:
obtaining, by a wireless device, extended discontinuous reception (DRX) parameters from a wireless network;
storing, by the wireless device, the extended DRX parameters;
camping, by the wireless device, on a cell of the wireless network;
waking up, by the wireless device, from an idle state based on the extended DRX parameters, wherein the wireless device wakes up at a time, prior to a paging occasion, wherein a time period from the time to the paging occasion has a duration during which the wireless device can perform a cell reselection procedure, and subsequently, a tracking area update;
measuring, by the wireless device, a metric of the cell in response to the waking up; and
monitoring, by the wireless device, a scheduled paging occasion, wherein the scheduled paging occasion is a paging occasion that is first to occur subsequent to the waking up.

2. The method of claim 1, further comprising:
determining, by the wireless device, whether a cell reselection procedure is to be invoked based on the measuring; and
determining, by the wireless device, to remain in the cell based on determining that the cell reselection procedure is not to be performed.

3. The method of claim 1, further comprising:
determining, by the wireless device, whether a cell reselection procedure is to be invoked based on the measuring; and
selecting, by the wireless device, a new cell on which to camp based on determining that the cell reselection procedure is to be performed.

4. The method of claim 3, further comprising:
obtaining, by the wireless device, a tracking area list, wherein the tracking area list indicates one or more tracking areas;
camping, by the wireless device, on the new cell;
determining, by the wireless device, whether a tracking area of the new cell is included in the tracking area list; and
omitting, by the wireless device, to invoke a tracking area update procedure based on determining that the tracking area of the new cell is included in the tracking area list, and wherein the monitoring further comprises:
monitoring, by the wireless device, the scheduled paging occasion in the cell.

5. The method of claim 3, further comprising:
obtaining, by the wireless device, a tracking area list, wherein the tracking area list indicates one or more tracking areas;
camping, by the wireless device, on the new cell;
determining, by the wireless device, whether a tracking area of the new cell is included in the tracking area list; and
invoking, by the wireless device, a tracking area update procedure based on determining that the tracking area of the new cell is not included in the tracking area list, and wherein the monitoring further comprises:
monitoring, by the wireless device, the scheduled paging occasion on the new cell.

6. The method of claim 1, further comprising:
determining, by the wireless device, whether a cell reselection procedure is to be invoked based on the measuring; and
determining, by the wireless device, to remain in the cell based on determining that the cell reselection procedure is not to be performed, and wherein the monitoring further comprises:
monitoring, by the wireless device, the scheduled paging occasion in the cell based on determining to remain in the cell.

7. The method of claim 1, wherein the extended DRX parameters comprise a parameter, wherein a value of the parameter indicates the time period.

8. The method of claim 1, wherein the wireless network is one of a Long Term Evolution (LTE) network or an LTE-Advanced network, and the method further comprising:
receiving, by the wireless device, an update pertaining to the extended DRX parameters, wherein a time period value indicating the time period is a dynamic value.

9. A device comprising:
a communication interface;
a memory, wherein the memory stores instructions; and a processor, wherein the processor is configured to execute the instructions to:
  obtain, via the communication interface, extended discontinuous reception (DRX) parameters from a wireless network;
  store the extended DRX parameters;
  camp on a cell of the wireless network;
  wake up from an idle state based on the extended DRX parameters, wherein the device wakes up at a time, prior to a paging occasion, wherein a time period from the time to the paging occasion has a duration during which the device can perform a cell reselection procedure, and subsequently, a tracking area update;
  measure, via the communication interface, a metric of the cell in response to a wake up; and
  monitor, via the communication interface, a scheduled paging occasion, wherein the scheduled paging occasion is a paging occasion that is first to occur subsequent to the wake up.

10. The device of claim 9, wherein the processor is further configured to execute the instructions to:
  determine whether a cell reselection procedure is to be invoked based on a measurement pertaining to the metric of the cell; and
  determine to remain in the cell based on a determination that the cell reselection procedure is not to be performed.

11. The device of claim 9, wherein the processor is further configured to execute the instructions to:
  determine whether a cell reselection procedure is to be invoked based on a measurement pertaining to the metric of the cell;
  perform a cell reselection procedure; and
  select a new cell on which to camp based on the cell reselection procedure.

12. The device of claim 11, wherein the processor is further configured to execute the instructions to:
  obtain a tracking area list, wherein the tracking area list indicates one or more tracking areas;
  camp on the new cell;
  determine whether a tracking area of the new cell is included in the tracking area list; and
  omit to invoke a tracking area update procedure based on a determination that the tracking area of the new cell is included in the tracking area list, and wherein when monitoring, the processor is further configured to execute the instructions to:
  monitor the scheduled paging occasion in the cell.

13. The device of claim 11, wherein the processor is further configured to execute the instructions to:
  obtain a tracking area list, wherein the tracking area list indicates one or more tracking areas;
  camp on the new cell;
  determine whether a tracking area of the new cell is included in the tracking area list; and
  invoke a tracking area update procedure based on a determination that the tracking area of the new cell is not included in the tracking area list, and wherein when monitoring, the processor is further configured to execute the instructions to:
  monitor the scheduled paging occasion in the new cell.

14. The device of claim 9, wherein the processor is further configured to execute the instructions to:
  determine whether a cell reselection procedure is to be invoked based on the measuring; and
  determine to remain in the cell based on a determination that the cell reselection procedure is not to be performed, and wherein when monitoring, the processor is further configured to execute the instructions to:
  monitor the scheduled paging occasion in the cell based on a determination to remain in the cell.

15. The device of claim 14, wherein the extended DRX parameters comprise a parameter, wherein a value of the parameter indicates the time period, and wherein the value is a dynamic value configurable by the wireless network.

16. A non-transitory storage medium that stores instructions executable by a processor of a computational device to:
  obtain extended discontinuous reception (DRX) parameters from a wireless network;
  store the extended DRX parameters;
  camp on a cell of the wireless network;
  wake up from an idle state based on the extended DRX parameters, wherein the computational device wakes up at a time, prior to a paging occasion, wherein a time period from the time to the paging occasion has a duration during which the computational device can perform a cell reselection procedure, and subsequently, a tracking area update;
  measure, via the communication interface, a metric of the cell in response to a wake up; and
  monitor a scheduled paging occasion, wherein the scheduled paging occasion is a paging occasion that is first to occur subsequent to the wake up.

17. The non-transitory storage medium of claim 16, further storing instructions executable by the processor of the computational device to:
  determine whether a cell reselection procedure is to be invoked based on a measurement pertaining to a metric of the cell;
  perform a cell reselection procedure; and
  select a new cell on which to camp based on the cell reselection procedure, wherein a time period value that indicates the time period is a static value.

18. The non-transitory storage medium of claim 17, further storing instructions executable by the processor of the computational device to:
  obtain a tracking area list, wherein the tracking area list indicates one or more tracking areas;
  camp on the new cell;
  determine whether a tracking area of the new cell is included in the tracking area list; and
  omit to invoke a tracking area update procedure based on a determination that the tracking area of the new cell is included in the tracking area list.

19. The non-transitory storage medium of claim 17, further storing instructions executable by the processor of the computational device to:
  obtain a tracking area list, wherein the tracking area list indicates one or more tracking areas;
  camp on the new cell;
  determine whether a tracking area of the new cell is included in the tracking area list; and
  invoke a tracking area update procedure based on a determination that the tracking area of the new cell is not included in the tracking area list.

20. The non-transitory storage medium of claim 19, wherein the instructions to monitor further comprise instructions executable by the processor of the computational device to:
  monitor the scheduled paging occasion in the new cell.

* * * * *